(12) United States Patent
Gross

(10) Patent No.: US 8,792,765 B2
(45) Date of Patent: Jul. 29, 2014

(54) OPTICAL FIBER CABLE CONNECTION HAVING RESILIENTLY DEFORMABLE GRIPPING SECTION

(75) Inventor: Charles M. Gross, Etters, PA (US)

(73) Assignee: FCI Americas Technology, Inc., Carson City, NV (US)

( * ) Notice: Subject to any disclaimer, the term of this patent is extended or adjusted under 35 U.S.C. 154(b) by 152 days.

(21) Appl. No.: 13/473,805

(22) Filed: May 17, 2012

(65) Prior Publication Data
US 2012/0314998 A1 Dec. 13, 2012

Related U.S. Application Data

(60) Provisional application No. 61/496,221, filed on Jun. 13, 2011, provisional application No. 61/543,989, filed on Oct. 6, 2011.

(51) Int. Cl.
*G02B 6/38* (2006.01)
(52) U.S. Cl.
CPC .................................. *G02B 6/3887* (2013.01)
USPC ........................................ 385/134; 385/147
(58) Field of Classification Search
CPC ....................................................... G02B 6/00
USPC .............................. 385/88–95, 147

See application file for complete search history.

(56) References Cited

U.S. PATENT DOCUMENTS

| | | | | |
|---|---|---|---|---|
| 4,822,131 A | * | 4/1989 | Anderton | 385/58 |
| 4,834,487 A | | 5/1989 | Abendschein et al. | 350/96.2 |
| 4,988,160 A | * | 1/1991 | Luettgert et al. | 385/58 |
| 5,073,043 A | | 12/1991 | DiMarco et al. | 385/81 |
| 5,113,464 A | * | 5/1992 | Wall | 385/81 |
| 5,222,169 A | | 6/1993 | Chang et al. | 385/87 |
| 5,644,673 A | * | 7/1997 | Patterson | 385/138 |
| 5,748,819 A | * | 5/1998 | Szentesi et al. | 385/60 |
| 6,422,764 B1 | | 7/2002 | Marrs | 385/81 |
| 7,530,966 B2 | * | 5/2009 | Woehr et al. | 604/110 |
| 7,785,017 B2 | | 8/2010 | Barnes et al. | 385/72 |

\* cited by examiner

*Primary Examiner* — Akm Enayet Ullah
(74) *Attorney, Agent, or Firm* — Harrington & Smith

(57) ABSTRACT

An optical fiber cable connector including a first member and a second member. The first member has a channel for an optical fiber of an optical fiber cable, and an outer surface configured to have a strength member of the cable located thereon. The second member is configured to slide on top of the first member. The second member includes a barrel section configured to be compressed onto the first member and a gripping section made of a resiliently deformable material which is sized and shaped to pull the strength member along the outer surface of the first member as the second member is slid on top of the first member.

19 Claims, 3 Drawing Sheets

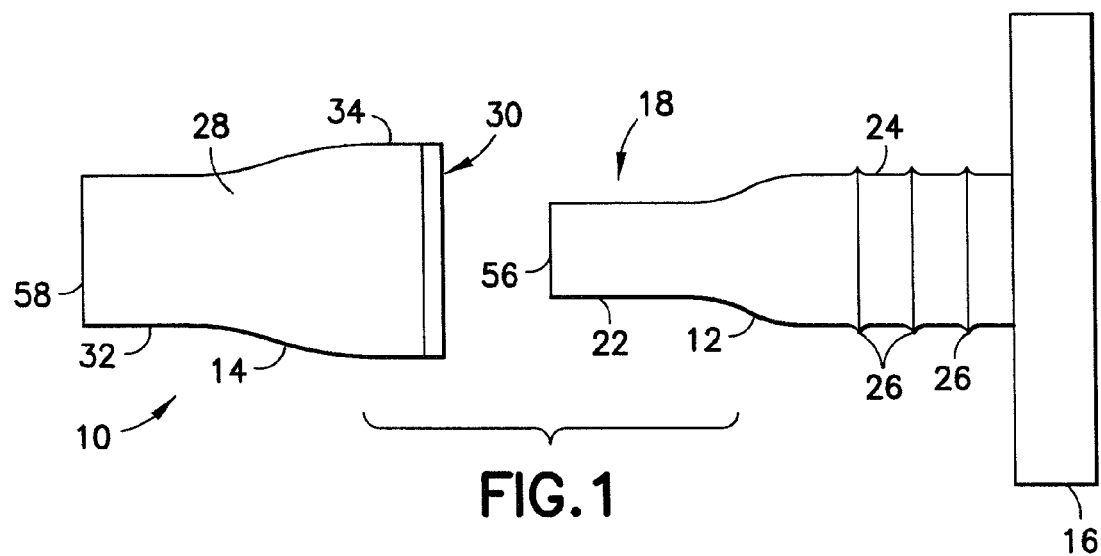
FIG. 1
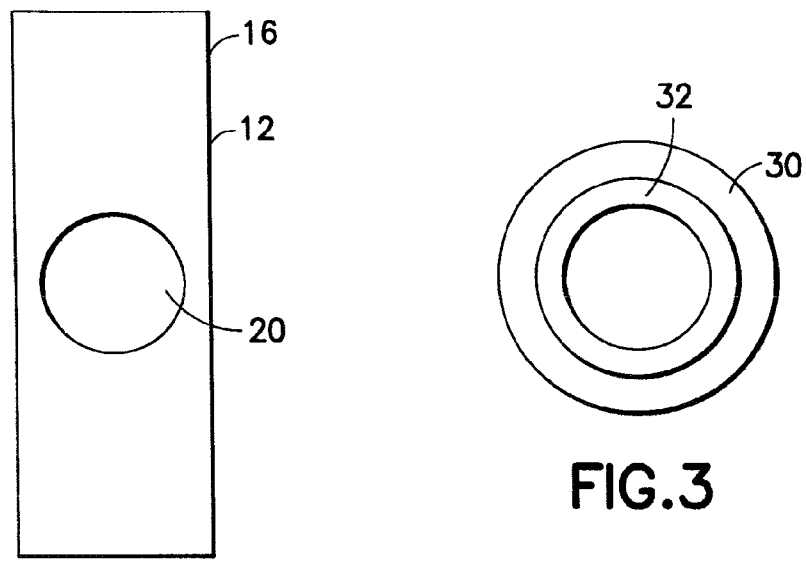
FIG. 2
FIG. 3

OPTICAL FIBER CABLE CONNECTION HAVING RESILIENTLY DEFORMABLE GRIPPING SECTION

CROSS REFERENCE TO RELATED APPLICATIONS

This application claims the benefit under 35 USC 119(e) on U.S. Provisional Patent Application No. 61/496,221 filed Jun. 13, 2011 and U.S. Provisional Patent Application No. 61/543, 989 filed Oct. 6, 2011, which are hereby incorporated by reference in their entireties.

BACKGROUND

1. Technical Field

The exemplary and non-limiting embodiments of the invention relate generally to an optical fiber cable connector and, more particularly, to a strain relief.

2. Brief Description of Prior Developments

U.S. Pat. No. 5,222,169 discloses an optical fiber connector assembly. Optical fiber cables have strength members or aramid yarn. When the cable is connected to a connector, the strength member is also terminated.

SUMMARY

The following summary is merely intended to be exemplary. The summary is not intended to be limiting.

In accordance with one aspect, an optical fiber cable connector is provided including a first member and a second member. The first member has a channel for an optical fiber of an optical fiber cable, and an outer surface configured to have a strength member of the cable located thereon. The second member is configured to slide on top of the first member. The second member includes a barrel section configured to be compressed onto the first member and a gripping section made of a resiliently deformable material which is sized and shaped to pull the strength member along the outer surface of the first member as the second member is slid on top of the first member.

In accordance with another aspect, an optical fiber cable connector is provided comprising a first member and a second member. The first member has a general tube shaped section with a first portion having a first outer diameter and a second portion having a larger second outer diameter, where the second portion comprises an outward projection, where the general tube shaped section has a channel for an optical fiber of an optical fiber cable. The second member is configured to slide on top of the general tube shaped section of the first member with an outer jacket and a strength member of the cable between the second member and the first portion of the first member and only the strength member between the second member and the second portion of the first member. The second member is configured to be compressed at a first location to crimp the outer jacket and the strength member against the first portion of the first member, and is configured to be compressed at a second location to crimp the strength member against the second portion of the first member with the outward projection directly fixedly gripping onto the strength member.

In accordance with another aspect, a method comprises locating an optical fiber cable on a first member of a connector, where an optical fiber of the cable is located in a channel of the first member, a strength member and outer jacket of the cable are located against an exterior side of a first portion of the first member, and the strength member is located against an exterior side of a second portion of the first member without the outer jacket; and applying tension to the strength member by sliding a second member over the first member where a resiliently deformable section of the second member pulls the strength member along the exterior side of the second portion as the second member is slid over the first member.

BRIEF DESCRIPTION OF THE DRAWINGS

The foregoing aspects and other features are explained in the following description, taken in connection with the accompanying drawings, wherein:

FIG. 1 is an exploded side view of an example embodiment of a connector;

FIG. 2 is a front end view of the first member shown in FIG. 1;

FIG. 3 is a front end view of the second member shown in FIG. 1;

DETAILED DESCRIPTION OF EMBODIMENT

Figure 4:
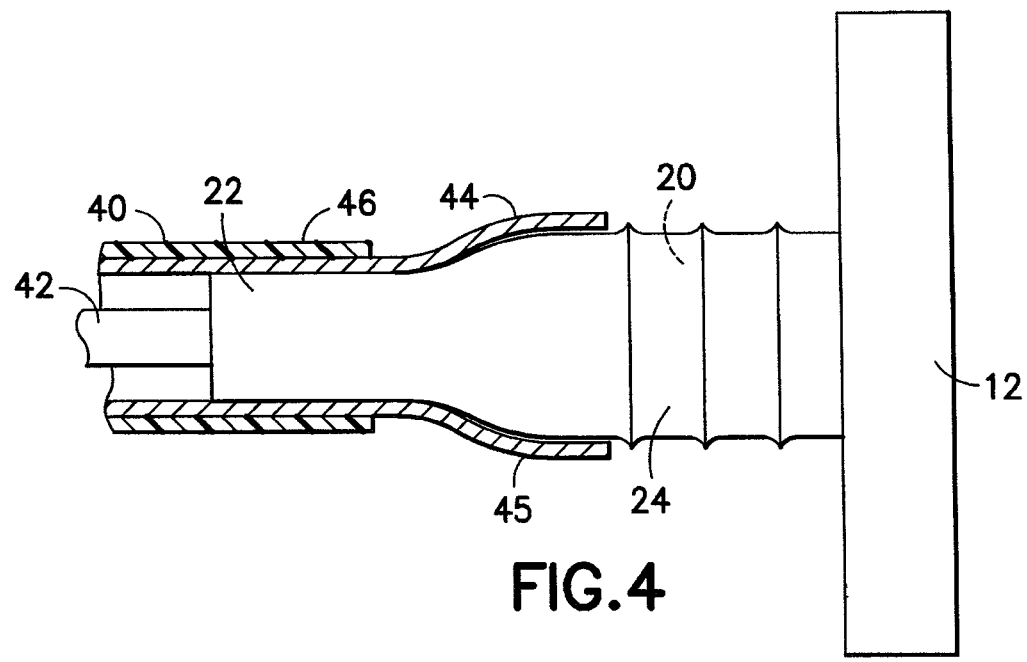
FIG. 4 is a partial cross sectional view showing initial connection of an optical cable to the first member shown in FIGS. 1 and 2.

Referring to FIG. 1, there is shown an exploded view of an optical fiber connector 10 incorporating features of an example embodiment. Although the features will be described with reference to the example embodiment shown in the drawings, it should be understood that features can be embodied in many alternate forms of embodiments. In addition, any suitable size, shape or type of elements or materials could be used.

The connector 10 generally comprises a first member 12 and a second member 14. The first member 12 is configured to be connected to a component (not shown) to provide alignment for the end of the optical fiber(s) of the cable to the component. The first member 12 may be comprised of any suitable material, such as metal for example. In the example shown, the first member is a one-piece member. Referring also to FIG. 2, the first member 12 has a mounting section 16 and a general tube shaped section 18. The two sections 16, 18 form a channel 20 which a portion of the cable can be located inside. The mounting section 16 is configured to be attached to the component (not shown), such as by fasteners for example. The tube shaped section 18 extends in a general cantilever fashion from the mounting section 16. The tube shaped section 18 comprises a first portion 22 and a second portion 24. The first portion 22 has a first outer diameter, and the second portion 24 has a larger second outer diameter. In this example, the outer surface of the second portion 24 includes projections 26 comprising annular rings. However, any suitable projections could be provided. Alternatively, no projections might be provided, and/or recesses could be provided.

The second member 14 comprises a barrel section 28 and a gripping section 30. The barrel section 28 is configured to be compressed onto the first member 12. In this example the barrel section is a one-piece member comprised of metal. However, any suitable material could be used, and the barrel section could comprise more than one member. The barrel section 28 has a general tube shape with an inner passage. The barrel section 28 has a first portion 32 with a first inner diameter and a second portion 34 with a larger second inner diameter.

Referring also to FIG. 3, the gripping section 30 is attached to the larger front end of the barrel section 28. The gripping section 30, in this example embodiment, comprises a resiliently deformable member in the shape of a ring. However, in alternate embodiments any suitable shape could be provided. The ring 30 may be comprises of rubber or other resiliently deformable polymer material. In another alternate embodiment the gripper section might comprise resiliently deflectable members, such as cantilevered pawls with teeth for example.

Figure 5:
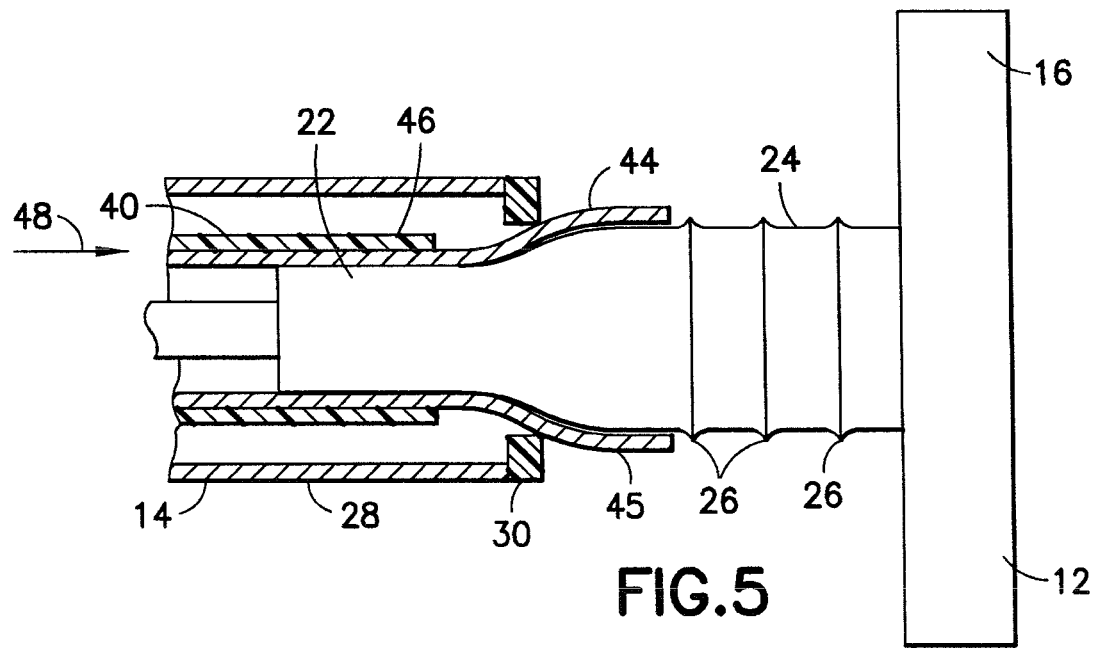
FIG. 5 is a view as in FIG. 4 showing subsequent initial locating of the second members shown in FIGS. 1 and 3 on the strength member of the cable.
Figure 6:
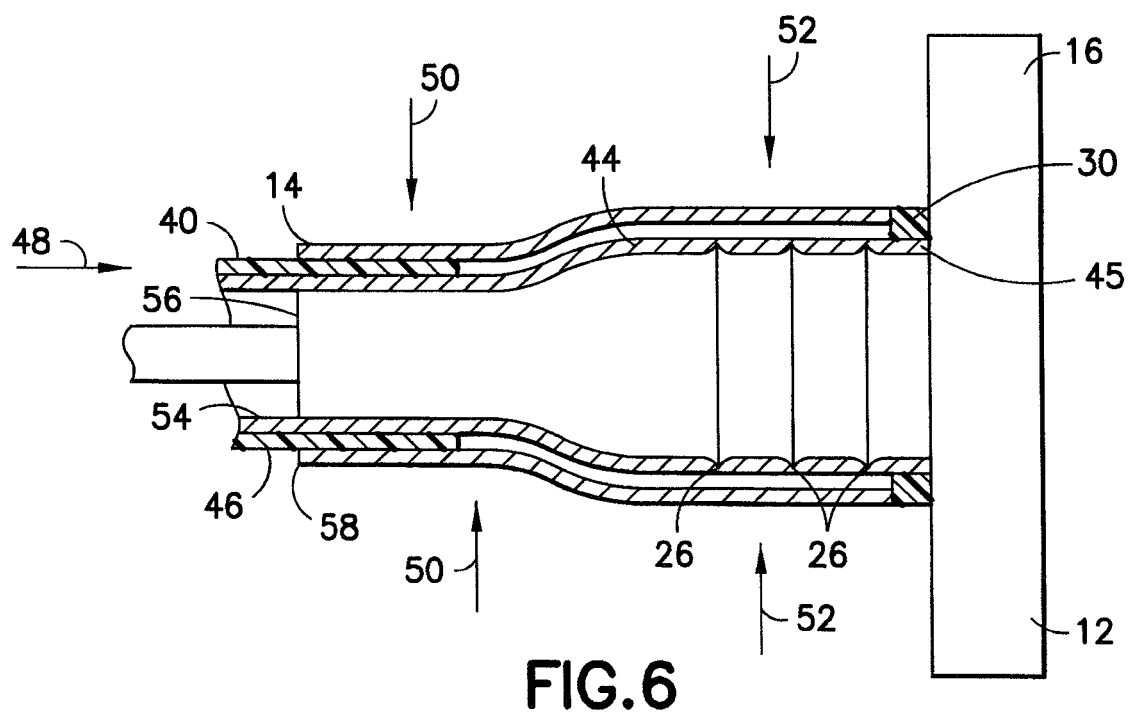
FIG. 6 is a view as in FIG. 5 showing subsequent mounting of the second member onto the first member putting the strength member under tension.

Referring also to FIGS. 4-6 connection of the connector 10 to an end of an optical fiber cable 40 will be described. As seen in FIG. 4, the optical fiber cable 40 is initially located on the first member 12 at a start position. The start position comprises the optical fiber(s) 42 extending into the channel 20, the front end 45 of the strength member 44 of the cable extending over the first portion 22 and onto the front of the second portion 24, and the outer jacket 46 of the cable being located over the first portion 22. In this example embodiment the strength member 44 comprises aramid yarn. However, features of various different embodiments could be used with any suitable type of strength member.

As seen in FIG. 5, the second member 14 is then slid over the first member in direction 48. The second member 14 can slide over the outer jacket 46. The gripping section 30 engages the front end 45 of the strength member 44 and, because of the size and shape of the gripping section 30, the gripping section 30 is able to frictionally pull the front end 45 along with the gripping section 30 in direction 48 over the projections 26 and towards the mounting section 16. Referring also to FIG. 6, the gripping section 30 is, thus, able to move the front end 45 towards the mounting section 12 from its initial start position shown in FIG. 4. The engagement between the gripping section 30 and the front end 45 might slip a little, but the gripping section is still able to drag the front end 45 of the strength member 44 over an exterior side length of the second portion 24 of the first member 12.

In this example, the gripping section 30 resiliently deflects or deforms outward at its inner side adjacent the strength member 44 to accommodate the projections 26 and still keep a tight pressure, by the gripping section 30, of the front end 45 against the exterior side of the second portion 24 of the first member 12.

As the second member 14 is pushed forward in direction 48 on the first member 12, and because at least some of the rest of the cable 40 encounters resistance from movement in the direction 48 by engagement with the first member 12, the strength member 44 is put under tension by the pulling action of the gripping section 30 on the strength member 44. Once the second member 14 is moved to its final position shown in FIG. 6, the barrel section 28 of the second member 14 is compressed or crimped to fixedly attach the components together. In the example embodiment shown, the barrel section 28 is crimped at two locations as indicated by arrows 50 and 52. The first crimp at the first location 50 crimps the second member 14 to the first portion 22 of the first member's tube shaped section 18 with the outer jacket 46 and strength member 44 therebetween. The second crimp at the second location 52 crimps the second member 14 to the second portion 24 of the first member's tube shaped section 18 with only the strength member 44 therebetween, and not the outer jacket 46. The projections 26 form an area on the exterior side of the first member to capture the strength member when the second member 14 is compressed.

By placing the strength member 44 under tension before the second member 14 is crimped to the first member 12, the strength member 44 is able to remain in tension proximate the connector 10 after the second member 14 is crimped to the first member 12. More specifically, a portion 54 of the strength member 44 located past the rear ends 56, 58 of the members 12, 14 is still in tension. This tension located past the ends 56, 58 of the members 12, 14 proximate portion 54 provides a strain relief function for the optical fiber(s) 42 with the first member 12. Thus, no additional separate member is needed to act as a strain relief. The strength member being under tension can function as the strain relief at the connector 10. This can save manufacturing costs by not having to provide and attach a separate strain relief member with the connector. An example embodiment can provide fiber optic cable strain relief and termination, keeping the aramid yarn under tension during termination of the strain relief, such that this connector and method can terminate both the outer jacket and the yarn simultaneously at locations 50 and 52.

An example embodiment can provide an optical fiber cable connector 10 comprising a first member 12 having a channel 20 for an optical fiber 42 of an optical fiber cable 40, and an outer surface configured to have a strength member 44 of the cable located thereon; and a second member 14 configured to slide on top of the first member, where the second member comprises a barrel section 28 configured to be compressed onto the first member and a gripping section 30 comprised of resiliently deformable material which is sized and shaped to pull the strength member 44 along the outer surface of the first member 12 as the second member is slid on top of the first member.

The first member may comprise a first section 22 having a first diameter and a second section 24 having a second relatively larger diameter. The barrel section 28 may comprise a first portion 32 having a first inner diameter and a second portion 34 having a larger second inner diameter. The second section 24 may comprise projections 26 on the outer surface. The barrel section 28 may comprise a first portion 32 having a first inner diameter and a second portion 34 having a larger second inner diameter, where the gripping section 30 comprises a general ring shaped rubber or polymer member. The projections 26 may comprise annular rings. The gripping section 30 may comprises a rubber or polymer member. The gripping section 30 may comprise a general ring shape. The barrel section may be comprised of metal. The connector may comprise means for applying tension to the strength member 44.

In one type of example embodiment, an optical fiber cable connector is provided comprising a first member 12 having a general tube shaped section 18 with a first portion 22 having a first outer diameter and a second portion 24 having a larger second outer diameter, where the second portion comprises an outward projection, where the general tube shaped section has a channel 20 for an optical fiber 42 of an optical fiber cable 40; and a second member 14 configured to slide on top of the general tube shaped section 18 of the first member with an outer jacket 46 and a strength member 44 of the cable between the second member and the first portion of the first member and only the strength member between the second member and the second portion of the first member, where the second member comprises a barrel section 28 and a gripping section 30, where the barrel section is configured to be compressed at a first location 50 to crimp the outer jacket and the strength member against the first portion of the first member, and is configured to be compresses at a second location 52 to crimp the strength member against the second portion of the first member with the outward projection directly fixedly gripping onto the strength member, and where the gripping section 30 comprises a resiliently deformable member which is sized and shaped to pull the strength member along the second outer diameter of the first member as the second member is slid on top of the first member.

The barrel section may comprise a first portion having a first inner diameter and a second portion having a larger second inner diameter. The barrel section may comprise a first portion having a first inner diameter and a second portion having a larger second inner diameter, where the gripping section comprises a general ring shaped rubber or polymer member. The projection may comprise an annular ring. The second member may comprise a gripping section is comprised of rubber or polymer. The gripping section may comprise a general ring shaped member. The second member may comprises a barrel section comprised of metal. The connector may comprise means for applying tension to the strength member.

One type of example method may comprise locating an optical fiber cable 40 on a first member 12 of a connector, where an optical fiber 42 of the cable is located in a channel 20 of the first member, a strength member 44 and outer jacket 46 of the cable are located against an exterior side of a first portion 22 of the first member, and the strength member 44 is located against an exterior side of a second portion 24 of the first member without the outer jacket; and applying tension to the strength member 44 by sliding a second member 14 over the first member where a resiliently deformable section 30 of the second member pulls the strength member along the exterior side of the second portion as the second member is slid over the first member.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications and variances which fall within the scope.

What is claimed is:

1. An optical fiber cable connector comprising:
    a first member having a channel for an optical fiber of an optical fiber cable, and an outer surface configured to have a strength member of the cable located thereon;
    a second member configured to slide on top of the first member, where the second member comprises a barrel section configured to be compressed onto the first member and a gripping section comprised of resiliently deformable material which is sized and shaped to pull the strength member along the outer surface of the first member as the second member is slid on top of the first member.

2. An optical fiber cable connector as in claim 1 where the first member comprises a first section having a first diameter and a second section having a second relatively larger diameter.

3. An optical fiber cable connector as in claim 2 where the barrel section comprises a first portion having a first inner diameter and a second portion having a larger second inner diameter.

4. An optical fiber cable connector as in claim 2 where the second section comprises projections on the outer surface.

5. An optical fiber cable connector as in claim 4 where the barrel section comprises a first portion having a first inner diameter and a second portion having a larger second inner diameter, where the gripping section comprises a general ring shaped rubber or polymer member.

6. An optical fiber cable connector as in claim 4 where the projections comprise annular rings.

7. An optical fiber cable connector as in claim 1 where the gripping section comprises a rubber or polymer member.

8. An optical fiber cable connector as in claim 7 where the gripping section comprises general ring shape.

9. An optical fiber cable connector as in claim 8 where the barrel section is comprised of metal.

10. An optical fiber cable connector as in claim 1 comprising means for applying tension to the strength member.

11. An optical fiber cable connector comprising:
    a first member having a general tube shaped section with a first portion having a first outer diameter and a second portion having a larger second outer diameter, where the second portion comprises an outward projection, where the general tube shaped section has a channel for an optical fiber of an optical fiber cable;
    a second member configured to slide on top of the general tube shaped section of the first member with an outer jacket and a strength member of the cable between the second member and the first portion of the first member and only the strength member between the second member and the second portion of the first member,
    where the second member comprises a barrel section and a gripping section, where the barrel section is configured to be compressed at a first location to crimp the outer jacket and the strength member against the first portion of the first member, and is configured to be compressed at a second location to crimp the strength member against the second portion of the first member with the outward projection directly fixedly gripping onto the strength member, and where the gripping section comprises a resiliently deformable member which is sized and shaped to pull the strength member along the second outer diameter of the first member as the second member is slid on top of the first member.

12. An optical fiber cable connector as in claim 11 where the barrel section comprises a first portion having a first inner diameter and a second portion having a larger second inner diameter.

13. An optical fiber cable connector as in claim 12 where the barrel section comprises a first portion having a first inner diameter and a second portion having a larger second inner diameter, where the gripping section comprises a general ring shaped rubber or polymer member.

14. An optical fiber cable connector as in claim 11 where the projection comprises an annular ring.

15. An optical fiber cable connector as in claim 11 where the second member comprises a gripping section is comprised of rubber or polymer.

16. An optical fiber cable connector as in claim 15 where the gripping section comprises a general ring shaped member.

17. An optical fiber cable connector as in claim 16 where the second member comprises a barrel section comprised of metal.

18. An optical fiber cable connector as in claim 11 comprising means for applying tension to the strength member.

19. A method comprising:
    locating an optical fiber cable on a first member of a connector, where an optical fiber of the cable is located in a channel of the first member, a strength member and outer jacket of the cable are located against an exterior side of a first portion of the first member, and the strength member is located against an exterior side of a second portion of the first member without the outer jacket; and applying tension to the strength member by sliding a second member over the first member where a resiliently deformable section of the second member pulls the strength member along the exterior side of the second portion as the second member is slid over the first member.

\* \* \* \* \*